(12) United States Patent
Lenell

(10) Patent No.: US 6,975,637 B1
(45) Date of Patent: Dec. 13, 2005

(54) APPARATUS FOR ETHERNET PHY/MAC COMMUNICATION

(75) Inventor: John K. Lenell, Irvine, CA (US)

(73) Assignee: Broadcom Corporation, Irvine, CA (US)

(*) Notice: Subject to any disclaimer, the term of this patent is extended or adjusted under 35 U.S.C. 154(b) by 0 days.

(21) Appl. No.: 09/539,602

(22) Filed: Mar. 31, 2000

Related U.S. Application Data

(63) Continuation-in-part of application No. 09/492,265, filed on Jan. 27, 2000.

(60) Provisional application No. 60/117,481, filed on Jan. 27, 1999, provisional application No. 60/127,147, filed on Mar. 31, 1999.

(51) Int. Cl.[7] .............................................. H04B 1/38
(52) U.S. Cl. ...................... 370/412; 370/419; 370/420; 370/395.2; 370/395.5
(58) Field of Search ............................ 370/412, 419, 370/420, 395.2, 395.5

(56) References Cited

U.S. PATENT DOCUMENTS

| | | | |
|---|---|---|---|
| 5,636,140 A | * | 6/1997 | Lee et al. .................... 370/469 |
| 5,809,026 A | * | 9/1998 | Wong et al. ................. 370/445 |
| 6,094,436 A | * | 7/2000 | Runaldue et al. ........... 370/420 |
| 6,272,551 B1 | * | 8/2001 | Martin et al. ................ 709/250 |
| 6,504,851 B1 | * | 1/2003 | Abler et al. ................. 370/466 |

OTHER PUBLICATIONS

Johnson, H.W., "Detailed Guide to Fast Ethernet," Fast Ethernet, Dawn of a New Network, 1996, Prentice Hall PTR, USA (XP-002149327), pp. 112-114 and 170-174.*
H. W. Johnson, "Detailed Guide to Fast Ethernet," *Fast Ethernet. Dawn of a New Network*, 1996, pp. 112-114, Chapter 3, Prentice Hall PTR, USA (XP-002149327).

* cited by examiner

*Primary Examiner*—Steven Nguyen
*Assistant Examiner*—Justin M. Philpott
(74) *Attorney, Agent, or Firm*—Squire, Sanders & Dempsey L.L.P.

(57) ABSTRACT

An integrated Ethernet PHY/MAC apparatus having a single link partner capability register shared between a PHY and a corresponding MAC, which implements IEEE Standard 302.3, including IEEE Standards 802.3u and 802.3x. Apparatus also includes plural PHYs, each having a corresponding MAC integrably coupled therewith such that an integrated multi-port Ethernet device is realized. A network consists of at least one integrated Ethernet PHY/MAC device having a single link partner capability register.

23 Claims, 12 Drawing Sheets

FIG.2

| ADDRESS[7:0] | DATA[63:0] |
|---|---|
| 00-CF | PACKET DATA |
| D0 | PORT 0 TRANSMIT DESCRIPTOR |
| D1 | PORT 1 TRANSMIT DESCRIPTOR |
| D2 | PORT 2 TRANSMIT DESCRIPTOR |
| D3 | PORT 3 TRANSMIT DESCRIPTOR |
| D4 | PORT 4 TRANSMIT DESCRIPTOR |
| D5 | PORT 5 TRANSMIT DESCRIPTOR |
| D6 | PORT 6 TRANSMIT DESCRIPTOR |
| D7 | PORT 7 TRANSMIT DESCRIPTOR |
| D8 | PORT 8 TRANSMIT DESCRIPTOR |
| D9-DF | UNUSED |
| E0-FF | 32 ARL TABLE ENTRIES |

FIG.3

| ADDRESS[16:0] | DATA[63:0] |
|---|---|
| 0000-00FF | MEMORY BLOCK 0 |
| 0000-01FF | MEMORY BLOCK 1 |
| 0000-02FF | MEMORY BLOCK 2 |
| 0000-FEFF | MEMORY BLOCK 3 TO 2046 |
| 0000-FFFF | MEMORY BLOCK 2047 |
| 0000-1FFFF | OPTIONAL MEMORY BLOCK 2048-4095 |

FIG. 4

| ADDRESS[7:0] | DATA[63:0] | | | | | | | |
|---|---|---|---|---|---|---|---|---|
| | [63:56] | [55:48] | [47:40] | [39:32] | [31:24] | [23:16] | [15:8] | [7:0] |
| 00 | B0 | B1 | B2 | B3 | B4 | B5 | B6 | B7 |
| 01 | B8 | B9 | B10 | B11 | B12 | B13 | B14 | B15 |
| – | – | – | – | – | – | – | – | – |
| 07 | B56 | B57 | B58 | B59 | B60 | B61 | B62 | B63 |
| 08 | B64 | B65 | UNUSED | | | | | |
| 08–CF | UNUSED | | | | | | | |

APPARATUS FOR ETHERNET PHY/MAC COMMUNICATION

CROSS-REFERENCE TO RELATED APPLICATIONS

The present application is related to co-pending application entitled INTEGRATED ETHERNET SWITCH, filed on even date herewith, both of which are a continuation-in-part of co-pending U.S. patent application Ser. No. 09/492,265, filed Jan. 27, 2000, entitled MEMORY STRUCTURE, which claims the benefit of the filing date of U.S. Provisional Patent Application Ser. No. 60/117,481, filed Jan. 27, 1999, entitled ETHERNET SWITCHING, and U.S. Provisional Patent Application Ser. No. 60/127,147, filed Mar. 31, 1999, entitled ETHERNET SWITCHING, all commonly owned by the Assignee of the present invention, the entire disclosures of which are expressly incorporated herein by reference.

BACKGROUND OF THE INVENTION

The invention herein relates to packet-based network switches; particularly to high-speed multi-port packet-based network switches; and more particularly to memory structures, and associated operational techniques, for high-speed multi-port packet-based network switches.

Present-day throughput demands on packet-based switched networks have created the necessity for switches exhibiting increasingly higher performance. It is most desirable to achieve the transmission speed of the physical transport medium, i.e. to be close to "wire speed." For high-speed LAN protocols, including those collectively called "Fast Ethernet," switches typically associated with operations incorporating OSI Reference Model Layer 2 (Data Link Layer) and Layer 1 (Physical Layer) are employed to meet the performance requirements reliably and economically. As the complexity of such devices increases, however, significant trade-offs, for example, between performance, scalability, and affordability may arise.

SUMMARY OF THE INVENTION

The present invention includes a communication device having a transceiver (PHY) and media access controller (MAC). The PHY communicates data packets with a link partner through a communication network according to a selectable communication protocol, such as an IEEE Standard 802.3 protocol. The PHY includes a data register which receives data representative of the communication protocol. The PHY is coupled with the MAC, which is adapted for use with packet-based communications.

The communication device also can include an autonegotiation controller which is coupled with the data register, or link partner capability register (LPCR), and which can use the data in the LPCR to select the communication protocol in cooperation with the link partner. The selectable communication protocol is one of a 10Base-T, or a 100Base-T protocol, and may be either half- or full-duplex communication. Among the 100Base-T communication protocols are 100Base-T4, 100Base-TX, 100Base-FX and 100Base-T2 communications protocols. The protocol also may include flow control protocols such as those defined by IEEE Standard 802.3x. In desired embodiments of the invention, the PHY and MAC are integrally coupled, preferably on a monolithic VLSI component.

Another aspect of the invention includes a device having multiple PHYs, each being integrally coupled with a corresponding MAC, the device constituting a multiport network switch. Indeed, it is contemplated that a switch, according to the present invention, have four, eight, nine, or more, such ports. In this embodiment, each PHYs can include an link partner capability register and an autonegotiation controller. Yet another embodiment of the invention is a communication network which includes at least one communication device as described above.

DESCRIPTION OF THE DRAWINGS

FIG. 2 is an illustration of one memory block configuration having an embodiment of the shared memory structure according to the invention herein;

FIG. 3 is an illustration of plural memory blocks, each having the memory structure illustrated in FIG. 2;

FIG. 4 is an illustration of one embodiment of an ARL Address Table of the present invention;

DETAILED DESCRIPTION OF THE INVENTION

Figure 1:
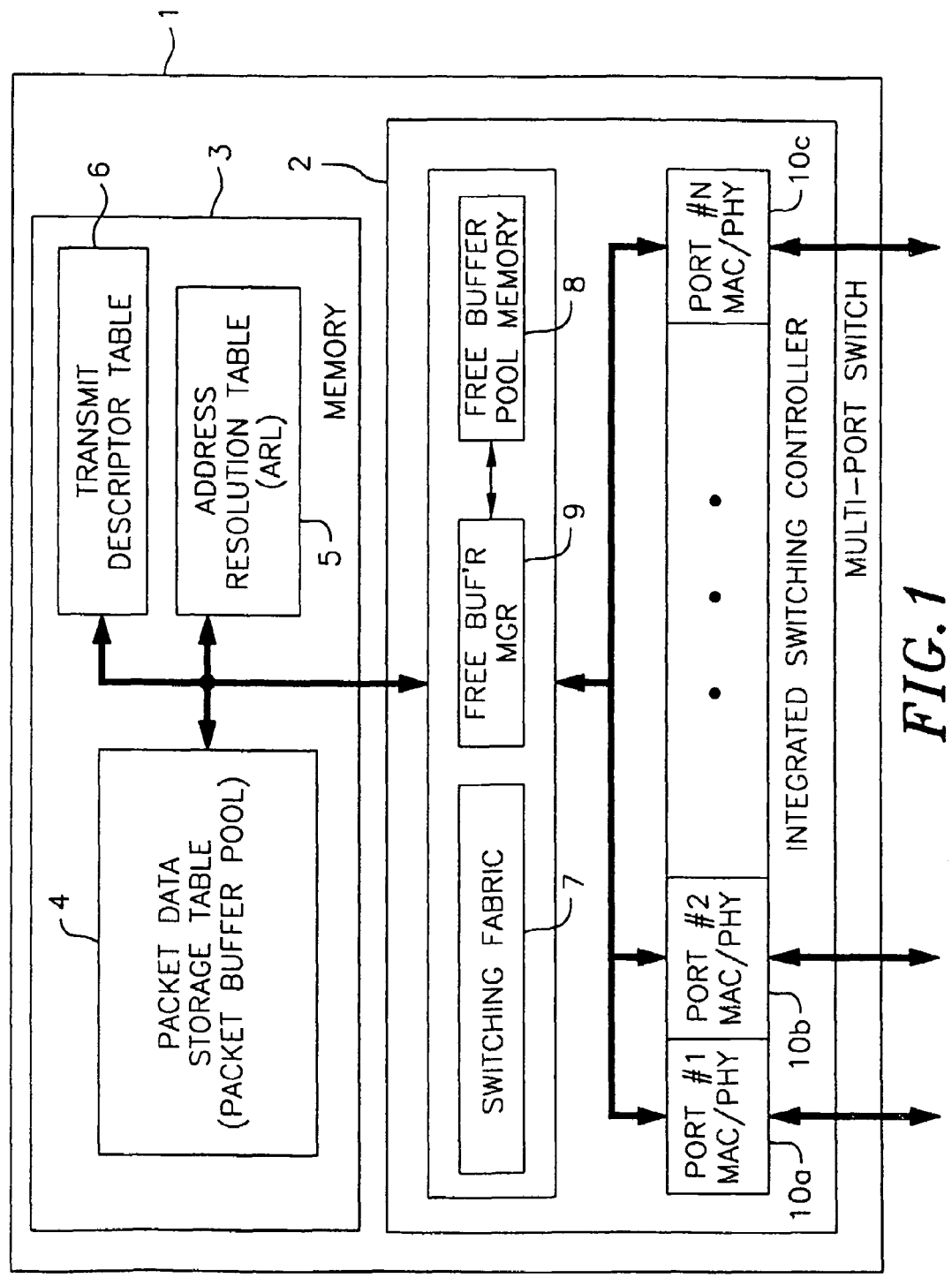
FIG. 1 is an illustration of a multi-port packet-based switch having an embodiment of the present invention.

The present invention is described in the context of the communication protocol defined by IEEE Standard 802.3, and supplemented, for example, by IEEE Standard 802.3u, which also is known as 100Base-T or "Fast Ethernet." Thus, embodiments of the present invention can be implemented in hybrid, or dual speed, 10/100Base-T devices. One skilled in the art would realize that this contextual description is exemplary, and that the invention can be practiced in the context of other packet-based communication protocols, and at wire speeds surpassing those embodied, for example, by the 100Base-T standard. Also, a skilled artisan would be familiar with the IEEE Standard 802.3, and thus would require no additional elaboration herein of these Standards to practice the invention. Furthermore, such IEEE Standards 802.3 including, without limitation, IEEE Standard 802.3u and IEEE Standard 802.3x, are incorporated by reference herein in their entirety.

A packet-based Layer 2 switch typically includes fundamental components such as physical layer transceivers (PHY), media access controllers (MAC), an address management unit, a packet switching fabric, random access memory, and the like. The physical transceiver layer, MAC, and other aspects of a packet-based switch can be defined by standards such as, for example, the IEEE 802.3 group of specifications (hereinafter referred to as "Ethernet" or, where appropriate, "Fast Ethernet"). The integration of some of these components is known in the art. However, total integration of all components onto a single chip may create performance trade-offs, depending, for example, upon the complexity of the switch. As the number of supported nodes increases, it becomes more difficult to meet power requirements and die size constraints, and still operate at, or near, wire speeds.

Among the functions supported, a Layer 2 switch resolves the destination of frames received at an ingress port by building a table of destination addresses and an associated egress port. An Ethernet destination address typically is a 48-bit value. Therefore, building a direct mapping for each possible address can require $2^{48}$ memory locations. Recognizing that only a small number of the $2^{48}$ addresses may be used in a LAN system, it is desirable to reduce the memory required to store the addresses, and to minimize the probability of an address search miss. Techniques to realize these goals include the use of a content-addressable memory (CAM), binary search algorithms, and hash tables with chain entries of depth greater than 1. However, such techniques can be costly to implement, and can degrade the frame rate resolution of destination addresses such that operation at wire speed can be difficult to maintain under some circumstances.

An embodiment according to the present invention includes a multiple port 10/100Base-T/TX switch device embodied on a single VSLI chip. This exemplary device integrates eight 10/100 autonegotiating transceivers (PHY), nine full-duplex-capable Media Access Controllers (MACs), an address management engine, and a non-blocking switch controller. Further, in the exemplary device, the ninth port can be configured as a Media Independent Interface (MII) port, or as a high-speed expansion interface to an additional switch device which allows for higher port density components. The device can interface directly to low-cost SSRAM for packet and address table memory. The integrated 10/100Base-T/TX transceivers can perform all of the physical layer functions for 100Base-TX full-duplex, or half-duplex Ethernet on CAT 5 twisted-pair cable, and 10Base-T full- or half-duplex Ethernet on CAT 3, 4, or 5-type cable.

The exemplary device also can provide nine internal Media Access Controllers. Each MAC is desired to be dual speed, and both half- and full-duplex capable. In the half-duplex mode, flow control can be provided using back pressure. In full-duplex mode, it is desired that 802.3x frame-based flow control be provided. In the present embodiment, the MAC is IEEE Std. 802.3-compliant and can support maximum frame sizes of, for example, 1522 or 1536 bytes.

An integrated address management engine can provide address learning and recognition functions even at maximum frame rates. The address resolution table can provide capacity for numerous addresses, for example, 16 k (16,384) unicast addresses, depending upon the memory size. Addresses can be added to the address table after receiving an error-free packet. Broadcast and multicast frames can be forwarded to all ports except the ingress port. The ninth port of the device can be configured for either an MII interface or a high-speed expansion port. In MII mode, the port interfaces to an external transceiver, and functions identically to the eight ports. The expansion mode can provide over 2 Gbps of bandwidth to a second exemplary device, thus providing a 16-port non-blocking network switch. Alternatively, the expansion port can be daisy-chained for higher port density switching.

It is desired that the device employ a single clock signal input, for example, a 25 MHz clock input signal, to drive an internal PLL device from which all clock frequencies needed by the exemplary device can be derived. Furthermore, the exemplary device can generate an output clock to other associated components, such as, for example, to the SSRAM through the SSRAM interface. Continuing the example, the frequency of the clock can be configured to be 33 MHz, 42 MHz, 62.5 MHz, or 66 MHz, although other clock frequencies may be employed.

FIG. 1 illustrates a packet-based multi-port switch 1 (hereinafter referred to as "the exemplary device") which includes an integrated switching controller 2, and a memory 3, external to switching controller 2. According to an embodiment of the present invention, it is contemplated that Packet Data Storage Table 4 be co-located with Address Resolution Table 5. In particular, it is most desirable that Packet Data Storage Table 4 share memory with ARL Table 5. Further, memory 3 also can include Transmit Descriptor Table 6. Integrated switching controller 2 can include switching fabric 7, free buffer pool memory 8, free buffer pool memory manager 9, and MAC/PHY components 10*a*, 10*b*, and 10*c*.

An advantage of having a shared memory structure 3 as contemplated by the present invention is the reduction in device pin count and in system implementation costs. An advantage of implementing the invention as a direct-mapped address table is that the number of memory accesses required for address resolution per Ethernet frame can be about one cycle per Ethernet frame for address learning, and about one cycle per Ethernet frame for address resolution. Furthermore, the memory addressing logic required to access the ARL table can be minimized. It is desirable to use a direct-mapped/one-way associative address table, indexed by a key, for example, extracted from the thirteen least significant bits of the 48-bit Ethernet frame destination address field.

In one embodiment of the invention, ARL Table 5 may be used without a shared memory structure. In this case, it is desirable for the table to be configured as an one-way associative, i.e., direct mapped, memory. In embodimentsof the invention in which the ARL Table 5 is shared with Table 4, Table, 6, or both, as well as with pool memory 8, it may be desirable to use another type of memory structure, including, without limitation, an n-way associative memory, a hash table, binary searching structure, and a sequential searching structure. One skilled in the art could readily select the appropriate a search technique for a given structure.

By using the one-way associative memory configuration for ARL Table 5, address resolution can be made simple, and memory access expeditious, thereby reducing the switching bandwidth needed to determine the packet destination port address, and to allow the Packet Data Storage Table 4 to be co-located with ARL Table 5. This direct-mapped configuration of ARL Table 5 reduces the switching bandwidth needed to determine the packet destination port address, and permits an associated device to operate at, or near, wire speed. Also, the direct mapping can be a significant factor in implementing the single, shared memory structure for the ARL Table 5 and Packet Data Storage Table 4, which facilitates switch operation at wire speeds.

The implementation of shared memory 3 and the implementation of a direct-mapped ARL Table 5, alone and together, are more desirable techniques to increase bandwidth than merely increasing clock frequency because operations using faster clock frequencies typically result in increased power requirements, and a need for faster memory which, itself, can add to the cost, and complexity, of the associated product. Thus, where it is desired to contain device power requirements and to minimize switch cost, the aforementioned approaches are beneficial.

By using a preselected portion of the packet destination address as an index into ARL Table 5, a address match can be resolved quickly, and the packet passed to the appropriate port for transmission. This destination address key direct-mapped address search enables multi-port packet-based switch 1 to be operable, for example, at wire speed in full-duplex, non-blocked, 100Base-TX operations. One skilled in the art would realize that the contemplated invention can be practiced in environments other than 100Base-T environments and at wire speeds in excess of 100 Mb/s.

FIG. 2 provides an illustration of one embodiment of a memory map 100 that can implement a block of memory such as memory 3 in FIG. 1. At first address locations 11 (00-CF), there exists a single buffer 12 for an individual packet. A transmit descriptor table, similar to Transmit Descriptor Table 6 in FIG. 1, is created by allocating sufficient memory beginning at first memory location 13 (D0) to second memory location 15 (D8) which encompass port 0 transmit descriptor 14 through port 8 transmit descriptor 16. Also, an address resolution table similar to ARL Table 5 in FIG. 1, can be created by allocating a memory segment 17 such that it contains a preselected number of ARL table entries 18 (e.g., 32 entries).

With one buffer per packet, only one transmit descriptor read per packet is performed, eliminating multiple memory accesses to find, for example, a linked list of buffers in an external memory. Given the starting address of the frame and the length of the frame in the transmit descriptor, only one access is executed in order to locate the entire packet to be transmitted. In a typical linked-list buffer approach, employing a small, fixed buffer block size, additional transmit descriptor reads may be required in order to locate each subsequent block. Each additional read signifies an undesirable reduction in available bandwidth.

Furthermore, the single buffer per packet approach as contemplated herein reduces the number of buffers that need to be searched. A skilled artisan would appreciate the significant bandwidth savings that can be attributed to the one buffer per packet approach. The single buffer-per-packet technique enhances the feasibility of the bit-per-buffer free buffer pool tracking technique, as well, and the need to search a large buffer pool structure can be mitigated or eliminated. In view of the foregoing, it can be seen how embodiments of the contemplated invention effect switch operation at, or near, wire speed.

FIG. 3 is illustrative of the scalability of this shared memory structure in that the memory structure described in FIG. 2 can be allocated in address range 19 of memory block 20. A skilled artisan would realize that one or more such blocks can be used to achieve the desired design criteria.

FIG. 4 illustrates one embodiment of the direct-mapped address table indexing using, for example, a 13-bit key derived from the 48-bit MAC address value, i.e., the Ethernet frame destination address field 21. As previously described, the least significant bit 23 of address value 21 is mapped to the least significant bit 24 of key 22. In this example, the address table entries, therefore, are offset in the address space from the index by F0$_h$. The most significant bit location 25 can obtain its value 26 from bit 35 of the corresponding MAC address value 21. If desired, a fourteenth bit from MAC address 21 can be used to provide a bit value 28 for the most significant bit 27 for key 22.

Thus, a packet-based switch implementing the shared memory structure according to the contemplated invention performs one memory read for address resolution, and one memory write for address learning, to the address table for each frame received. The reduced overhead provided by embodiments of present invention leads to a reduction in memory accesses per Ethernet frame (in this example, a frame is 64 bytes in length, and the associated bus width is 64 bits). The number of such memory accesses can be characterized as: one cycle per frame for address resolution; one cycle per frame for address learning; one cycle per frame for transmission read; one cycle per frame for transmission write; one cycle per eight bytes for a frame data read; and one cycle per eight bytes for a frame data write.

The single access for both read and write can be attributed to the single-entry direct-mapped address table. Using this configuration, each MAC address maps to a single location in the address table. Therefore, only one access may be needed to read or write the MAC address. A single-entry direct-mapped address table may increase the probability of address collisions. However, the probability of these collisions can be reduced by mapping over a larger number of MAC address bits, such as the 14 bits illustrated in FIG. 4. The single MAC address read and write for each Ethernet frame can contribute to the ability of switch 1, in FIG. 1, to operate at wire speed, in a full-duplex, non-blocking manner.

To further enhance the functionality of switch 1 in FIG. 1, a transmit descriptor request may be made during the transmission of a previous frame, thereby removing the transmit descriptor reads from the generation of latency. Also, it is desirable that a FIFO structure be used so that a first portion of the FIFO data can be read to initiate transmission while the remaining portion of the FIFO structure is still receiving data.

In one embodiment of the invention, memory structure 3 of FIG. 1 employs a 64-bit memory bus operating with a 66 MHz system clock. Throughput can further be enhanced by implementing a memory arbitration scheme such as a weighted priority round-robin memory arbitration technique. This technique enhances the memory structure's quantization and prioritization of memory accesses, further reducing latency loss and bandwidth requirements.

An embodiment of the present invention contemplates the implementation of a memory arbiter that, in this example, provides arbitration for six types of memory accesses. The arbiter sets priority between the Ethernet ports as highest priority and that of an expansion port as the lowest priority for each of the memory access types. Each access type is also prioritized such that the access type meets the latency requirement for maintaining wire speed switching of the supported function. The selected arbitration and associated priority are as shown in Table 1.

TABLE 1

| Access Type | Priority | Cycles/Access | Access/Frame # |
| --- | --- | --- | --- |
| Frame Data Writes | 1 | 4 | 2 |
| Frame Data Reads | 2 | 4 + 2 Turnaround | 2 |
| Transmit Descriptor Read | 3 | 1 + 2 Turnaround | 1 |
| Destination Address Read | 4 | 1 + 2 Turnaround | 1 |
| Transmit Descriptor Write | 5 | 1 | 1 |
| Source Address Write | 6 | 1 | 1 |

*64-byte Ethernet Frame

The cycles/access number refers to the number of system clock cycles required to perform memory access when interfacing, for example, to an external synchronous static RAM in flowthrough mode, with 64-bit data word width.

Data packets can be stored in Packet Data Storage Table 4 of FIG. 1, with a packet data address portion, and a packet data value portion. References to packets are often passed within switch 1, which can, for example, use the upper nine buffer bits of Table 4 as a pointer value. These pointer values are passed between the Free Buffer Manager 9 and ports 10*a*, 10*b*, 10*c*. The data address pointer value can also be passed between the switch RX ports and the switch TX ports via the transmit descriptor, which is similar to descriptor 14.

Figure 5:
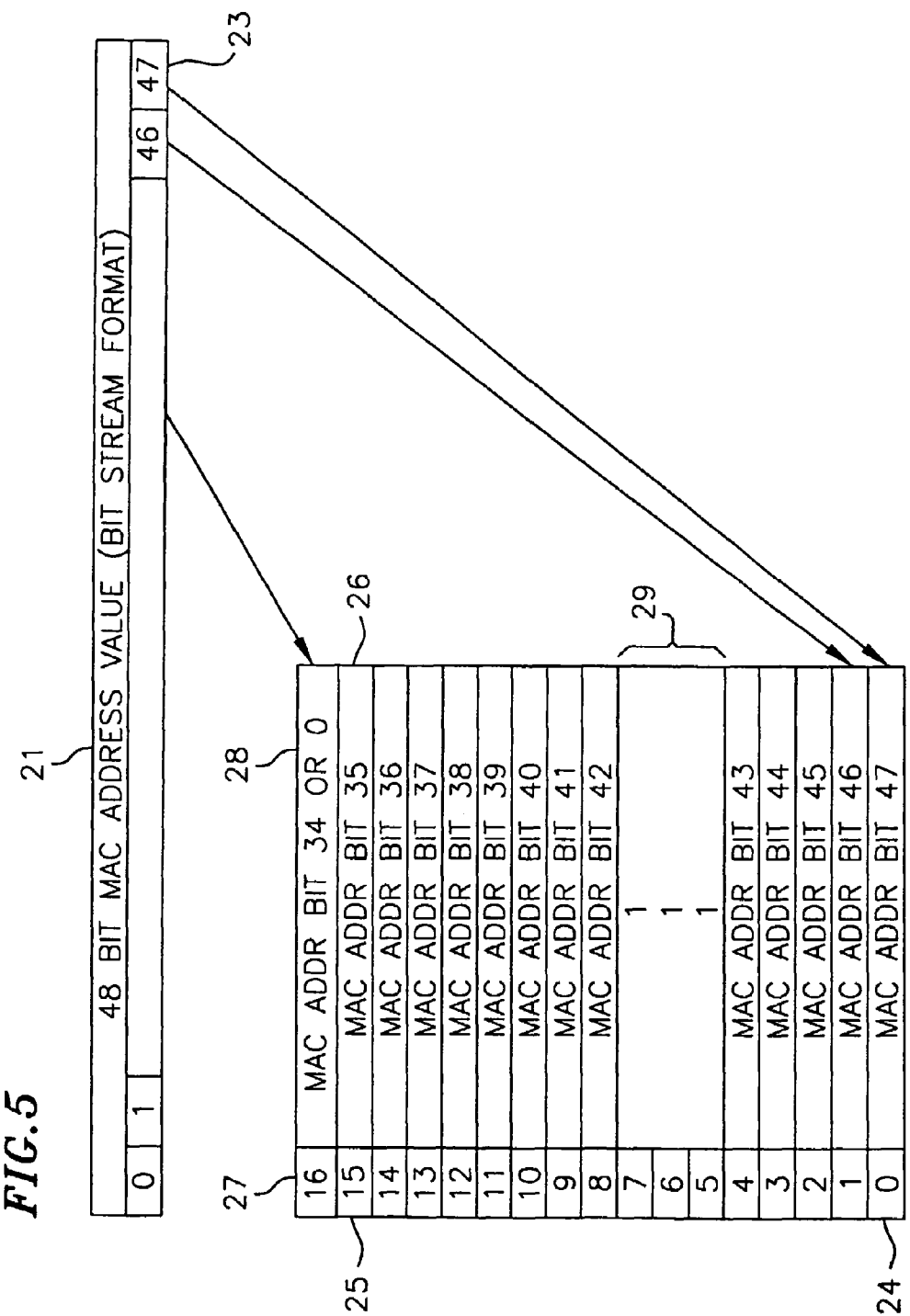
FIG. 5 is a table illustrative of storage for an individual 66-byte packet in the context of the invention herein.

FIG. 5 illustrates how packet data values can be stored. In the example of FIG. 5, a 66-byte packet is stored. As seen in FIG. 5, it is desired to store packet data in 64-bit wide memory segments, such that the efficiencies brought about by the 64-bit wide memory data path are further realized.

Figure 6:
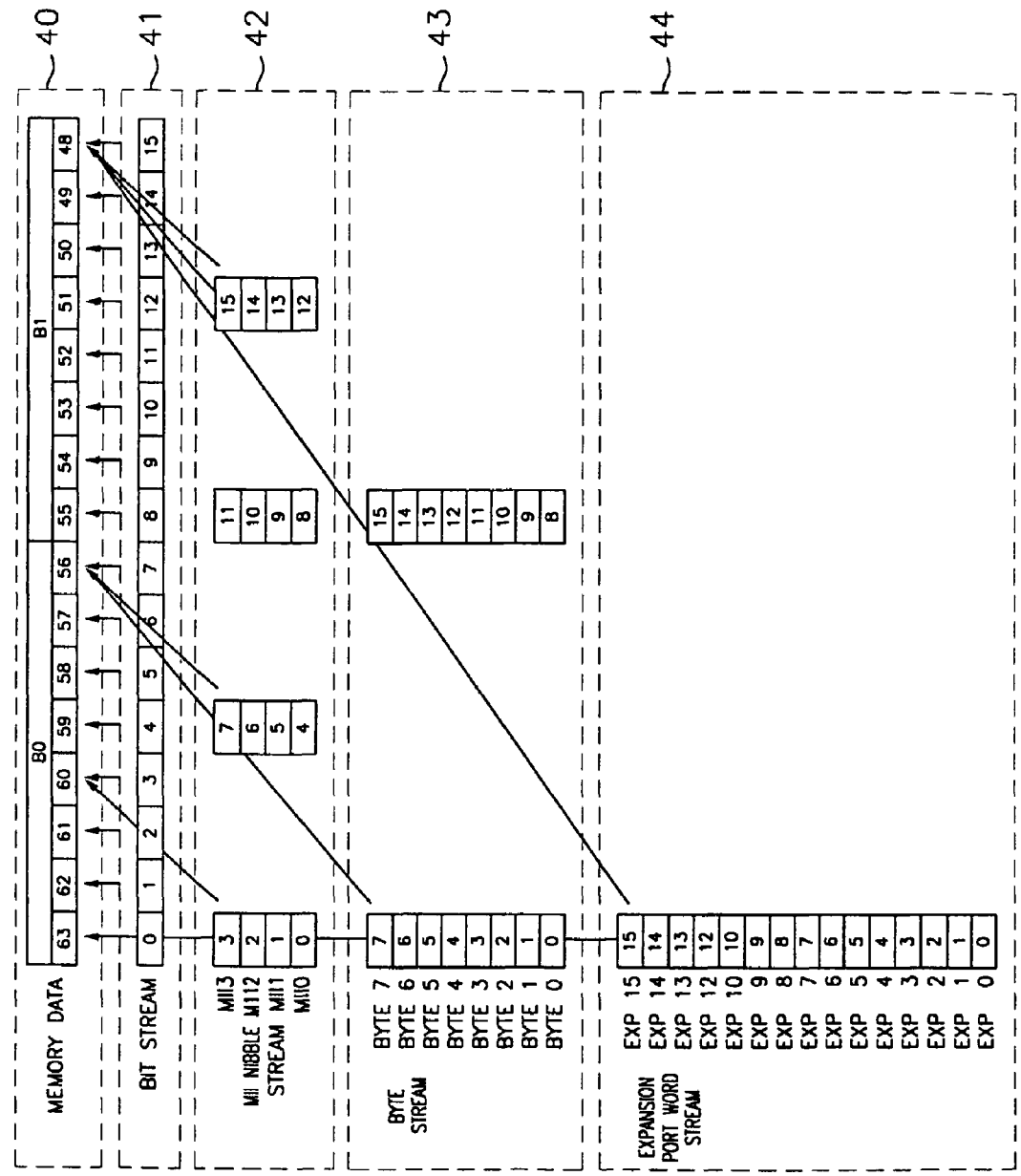
FIG. 6 is a an illustration of a packet data bit mapping table implementing an embodiment of the present invention.

FIG. 6 is exemplary of mapping a transmission format to other selected memory formats. Although the format normally used to display Ethernet data is a byte-stream format 40, FIG. 6 also displays the Ethernet data in a bit-stream format 41, a nibble-stream format 42, a byte-stream format 43 and a word-stream format 44.

In FIG. 1, it is desired that there be one Transmit Descriptor Table 6 for each transmit port. Thus, a switch having multiple ports (e.g., 4, 8, or 9 ports) could use a corresponding number of Transmit Descriptor Tables 6 (e.g., 4, 8, or 9 tables). It is also desired that each Transmit Descriptor Table 6 consist of a circular queue structure, i.e., a FIFO, that can hold a pointer value for each buffer in switch 1. Typically, a circular queue structure (FIFO) has a tail pointer and a head pointer that are maintained in each TX block. When the values are the same, the queue is empty.

Figure 7:
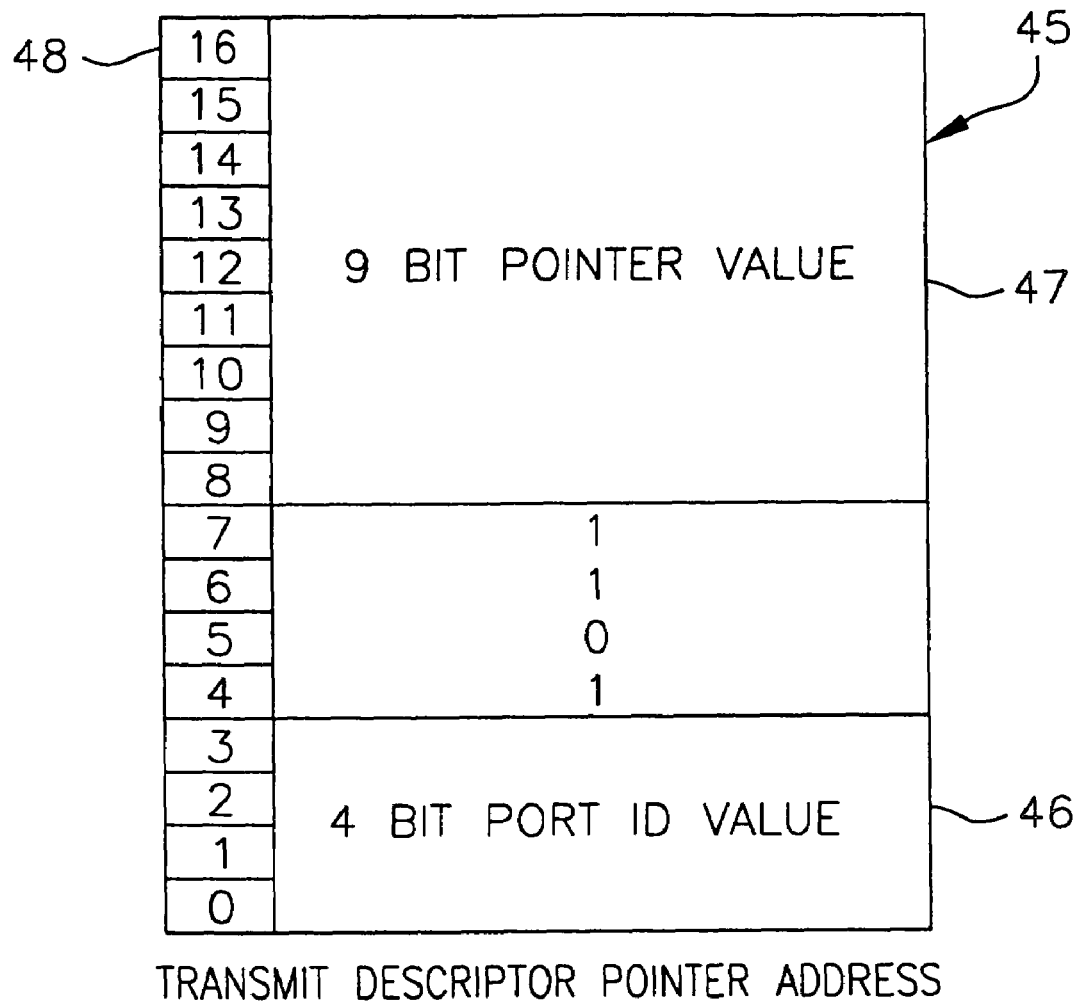
FIG. 7 is an illustration of a transmit descriptor pointer address as implemented by an embodiment of the present invention.

FIG. 7 illustrates the desired structure of a head pointer, a tail pointer, or both. In FIG. 7, head pointer 45 is described in this example, although a tail pointer can have the same structural format. Port ID 46 is desired to be static for each transmit port. Nine-bit pointer value 47, in this particular example, is indicative of the head pointer value. Where a reduced amount of memory is used to implement Table 6 of switch 1 in FIG. 1, then the sixteenth bit, 48, of FIG. 7 can be forced low on all memory accesses, having the effect of wrapping the transmit descriptor queues to fit within the available memory without affecting switch 1 operation.

Figure 8:
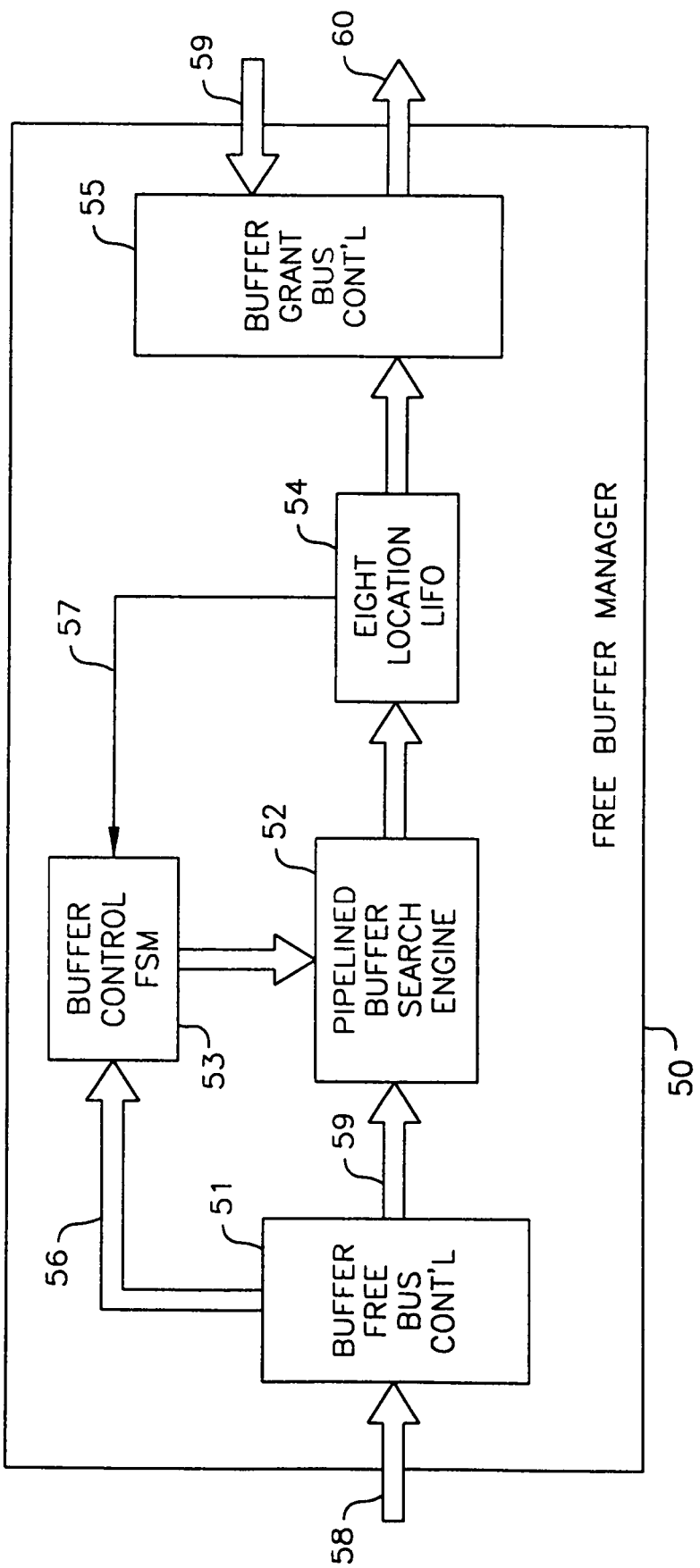
FIG. 8 is a block diagram of an embodiment of the free buffer manager.

FIG. 8 is an embodiment of a free buffer manager 50 similar to free buffer manager 9 shown in FIG. 1. Manager 50 can include a buffer free bus controller 51, a pipeline buffer search engine 52, a buffer control finite state machine 53, a buffer bus register 54 and a buffer grant bus controller 55. It is desirable that register 54 be a LIFO and, for the purposes of the description herein, register 54 is an eight-location LIFO. It is the responsibility of manager 50 to "grant" new buffers to ports before a data packet is received, and to collect, or "free," used buffers from ports that have transmitted a packet. Typically, one grant operation will be needed for each packet received by the switch, and one free operation will be needed for each packet transmitted by the switch.

In an embodiment of the present invention, a fixed number of buffers are employed. Used buffers are those that have been granted to a receive port, but have not yet been returned, or freed, by a transmit port. All of the remaining buffers are designated "unused". It also is the buffer manager's responsibility also to track unused buffers so that they can be granted. Although one simple method to track unused buffers is to maintain a buffer list, such a list may create undesirable space limitations on a switch device because the list area must be long enough to store all of the buffers in a system and, further, each location in the list must be able to store the number of, or a pointer to, any buffer in the system. In a device having 512 list locations, for example, with each location having a corresponding nine-bit pointer, 4608 bits of storage would be required.

By contrast, another embodiment of the invention herein, implementing a bit-per-buffer method of tracking free buffers, reduces the storage requirement to only 512 bits, with each bit corresponding to a specific buffer. Here, a used buffer is indicated by setting the corresponding buffer bit. For example, setting the 368 bit in free buffer pool memory 8 in FIG. 1, can indicate that buffer 368 is currently being used.

Although this method does present an economy of storage and circuit area, it is further desired to employ a pipelined engine 52 to search for buffers in the bit array, such that the impact of "free" operations on search speeds is limited and that fast grant rates are allowed. Register 54 is preferred to be an eight-location LIFO to further increase the peak grant rate of search engine 52. Buffer free bus controller 51 captures requests 58 for the freeing of buffers, and presents request 59 to search engine 52. In addition, controller 51 can provide a similar request 56 to finite state machine 53. Register 54 also provides a status signal 57 to finite state machine 53 and, in conjunction with request data signal 56 from free bus controller 51, buffer control finite state machine 53 can select one of a set of defined states.

Figure 9:
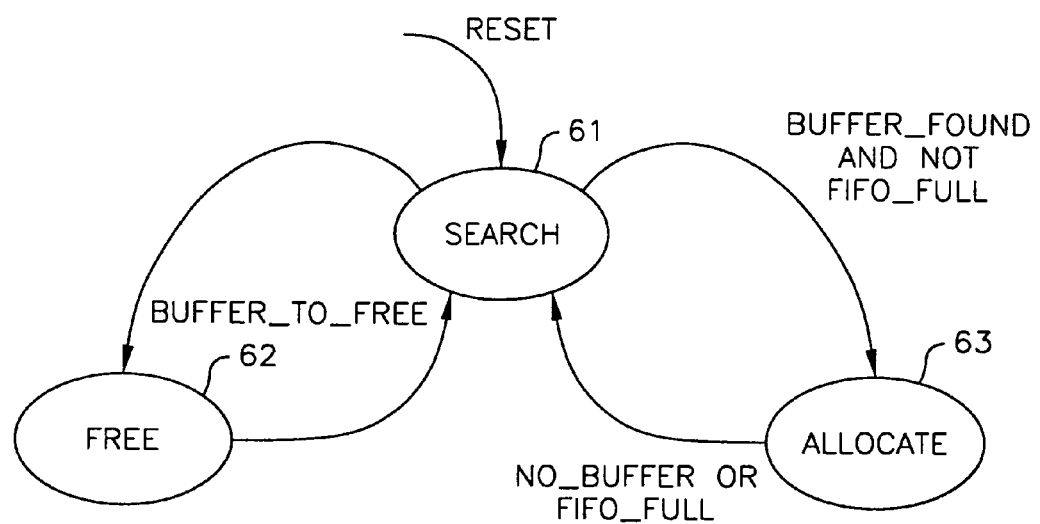
FIG. 9 is a state diagram illustrating the operation of one embodiment of the buffer control finite state machine in FIG. 8.

The state diagram of FIG. 9 illustrates the three states of state machine 53 in FIG. 8. These three states can include:
1) SEARCH (61)—search for zero-valued bits that are in the buffer control array, indicating the location of a free buffer;
2) FREE (62)—write a zero to a bit location specified by free controller 51, thus freeing the associated buffer for allocation; and
3) ALLOCATE (63)—write a one value to a bit location that was identified during search state 61 by search engine 52.

Returning to FIG. 8. Buffer Search Engine 52 is preferred to be pipelined in both address and data paths, around the buffer control bit memory array, in order to expedite the identification of available buffers. The eight-location LIFO 54 can store the locations of allocated buffers until they are needed by the Buffer Grant Bus Controller 55. Finally, Buffer Grant Bus Controller 55 waits for requests 59 from the received port for buffers and presents the buffer location 60 if available from the LIFO.

Physical Layer Transceivers (PHY)

In the 100Base-TX mode, the transceiver of the exemplary device can transmit and receive a continuous data stream on twisted-pair wire. During transition, nibble-wide (4-bit) data from the MAC is encoded into 5-bit code groups and inserted into the transmit data stream. The transmit packet can be encapsulated by replacing the first two nibbles of the preamble with a start-of-stream delimiter and appending an end-of-stream delimiter to the end of the packet. When the MII transmit error input is asserted during a packet transmission, the transmit error code group can be set in place of the corresponding data code group. The transmitter will repeatedly send the idle code group in between packets.

In the TX mode, the encoded data stream can be scrambled by a stream cipher block, and then serialized and encoded into MLT3 signal levels. A multimode transmit DAC can be used to drive the MLT3 data on to the twisted-pair cable. Following baseline wander correction, adaptive equalization and clock recovery in the TX mode, the received data stream can be converted from MLT3 to serial NRZ data. The NRZ data can be descrambled by the ream cipher block and then be serialized and aligned into 5-bit code groups. The 5-bit code groups can be further decoded into 4-bit data nibbles, and provided as the input stream to the MAC. The start-of-stream delimiter can be replaced with preamble nibbles and the end-of-stream delimiter and idle codes can be replaced with all zeros. When an invalid code group is detected in the data stream, the transceiver can assert a receiver error indicator to the MAC. In 10Base-T mode, Manchester encoding and decoding can be performed on the data stream. It is desired that the multimode transmit DAC performs pre-equalization for 100 meters of CAT 3 cable.

The transceiver can perform 4B5B, MLT3, NRZI, and Manchester encoding and decoding, clock and data recovery, stream cipher scrambling/descrambling, digital adaptive equalization, line transmission, carrier sense and link integrity monitor, autonegotiation and MII management functions. Each of the eight integrated transceiver ports of the exemplary device can connect directly to the network media through isolation transformers. The integrated transceiver is desired to be fully compliant with the IEEE 802.3, including IEEE Standard 802.3u.

In the 100Base-TX mode, receive signal energy typically is detected by monitoring the receive pair for transitions in the signal level. Signal levels are qualified using squelch detect circuits. When no signal, or certain invalid signals, are detected on the receive pair, the link monitor will enter and remain in the "Link Fail" state, where only idle codes will be transmitted. When a valid signal is detected on the receive pair for a minimum period of time, the link monitor will enter the "Link Pass" state, and the transmit and receive functions will be enabled. In the 10Base-T mode, a linkpulse detection circuit may constantly monitor the receive pins for the presence of valid link pulses. In half-duplex mode, collisions can be detected whenever the transceiver is simultaneously transmitting and receiving activity.

Each internal transceiver is desired to possess the ability to negotiate its mode of operation over the twisted-pair link using the autonegotiation mechanism defined in the IEEE 802.3u specification. During autonegotiation, each port will automatically choose its mode of operation by advertising its abilities, and comparing them with those received from its link partner. The exemplary device can be configured to advertise 802.3x flow-control capability. The transceiver will negotiate with its link partner, and choose the highest level of operation available for its own link. In the FDX mode, flow control also can be negotiated. In the HDX mode, flow control can be enabled or disabled based on pin strappings. The autonegotiation algorithm supports the parallel detection function for legacy 10Base-T devices and 100Base-TX-only devices that do not support autonegotiation.

Link Partner Capability Register and Autonegotiation

It is very desirable to implement the autonegotiation function in network switches supporting multiple communication protocols, such as those defined by IEEE Standard 802.3. Autonegotiation is a mechanism that takes control of a communication channel when a point-to-point connection is established in a communication network. A connection using the highest performance technology available is established, automatically, without intervention by user, system manager, or management software.

In addition to supporting 100Base-T communication protocols as defined by IEEE Standard 802.3u, autonegotiation also can create a communication link with a 10Base-T device, or a faster communication device that does not implement autonegotiation. Furthermore, autonegotiation allows link partners to determine whether either is capable of implementing full duplex flow control under the IEEE Standard 802.3x.

In general, a communication system contains a physical layer device (PHY), e.g., a transceiver, and a media access controller (MAC), both of which operate under a defined IEEE protocol to exchange configuration information. The communication devices linked using autonegotiation may be referred to as link partners. Autonegotiation can detect the various modes of operation that may be available in, and to, the local link partner, the remote link partner, or both. The local communication device can utilize its own performance capabilities, along with its remote link partner capabilities, to automatically determine the highest performance mode of a selectable communication protocol that may be available between the local and remote communication devices.

Each of the link partner capabilities may be represented by one or more data bits. Thus, link partner capability data are representative of the selectable communication protocol. During the exchange process, one of the fields that it passes in the protocol is the link partner's capability. Typically, a data register is used to store the data representative of these local and remote link partner capabilities. For the purposes of the discussion herein, the data register storing link partner capability data will be referred to as a link partner capability register (LPCR).

The fields of a LPCR can be defined by IEEE Standard 802.3 and include, for example, speed, signaling protocol, duplex capability, reset, remote link fault, and flow control (e.g., PAUSE) capability. The link partner capability data field will be exchanged, and then stored locally by the PHY in the LPCR. Control information stored in the LPCR can be used to configure the MAC for operation. Of note is that a communication device implementing autonegotiation is not constrained to operate in a communication network where both link partners implement autonegotiation. It is sufficient that one of the two communication devices be coupled to each other through the communication channel to implement autonegotiation.

Figure 10:
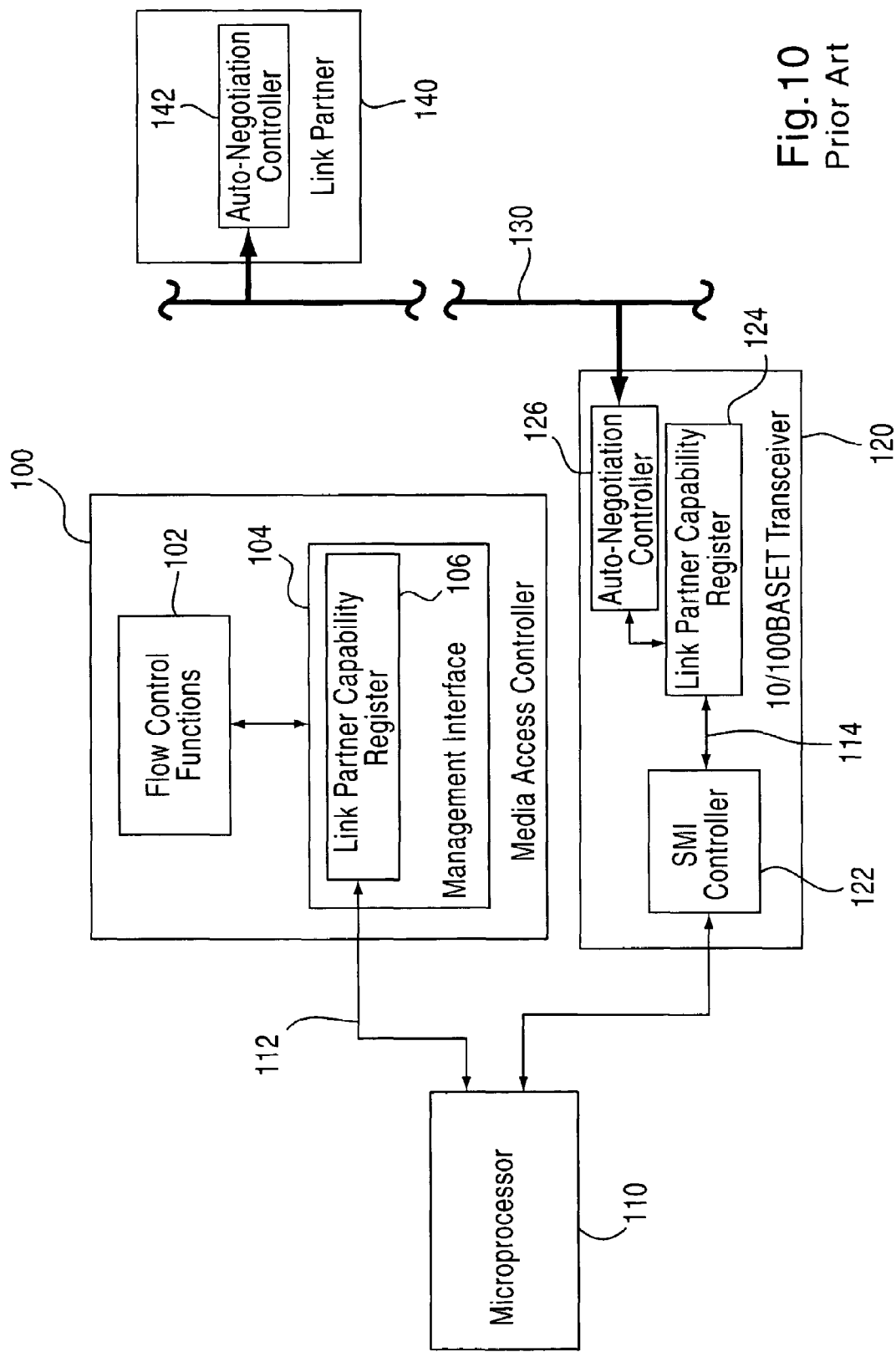
FIG. 10 is an illustration of a prior art device employing multiple link partner capability registers per MAC/PHY pair.
Figure 11:
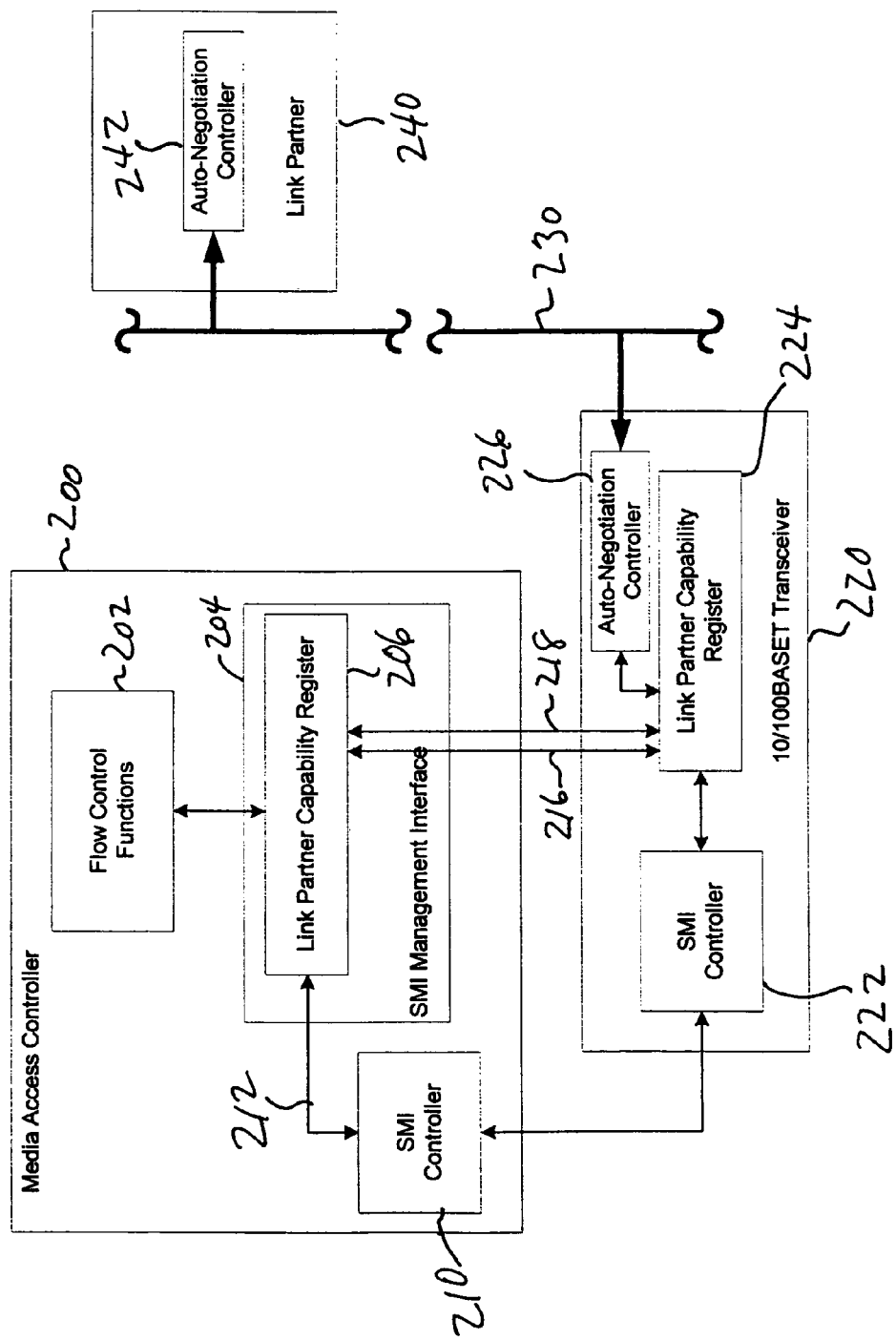
FIG. 11 is an illustration of another prior art device employing multiple link partner capability registers per MAC/PHY pair.

In the past, each communication device possessed two or more link partner capability registers. Also, the PHY and MAC were embodied on separate components. Previously, the PHY was not integrated with the MAC, and thus the link partner capabilities were provided via external interface signals, microprocessor control, or an integrated controller within the MAC. FIG. 10 and FIG. 11 illustrate two prior art structures that implement autonegotiation using two link partner capability registers, one LPCR being situated in the PHY and another LPCR in the MAC.

FIG. 10 illustrates a first prior art configuration in which MAC 100 and PHY 120 communicate link partner capability to each other by way of microprocessor 110. Microprocessor management interface 104 is used to transfer link partner capability data 112 in LPCR 106 between flow control functions 102 of MAC 100 and microprocessor 110. In particular, the link partner PAUSE capability is used by MAC flow control functions 102 to enable the PAUSE function within MAC 100. In turn, microprocessor 110 bidirectionally communicates with Serial Management Interface (SMI) controller 122. Controller 122 gets and puts the link capability data via LPRC 124, typically using a link partner capability signal 114, which may include IEEE-defined data signals MDIO and MDC. The serial management interface configuration generally is defined by the IEEE Standard 802.3. Autonegotiation controller 126 senses conditions on network channel 130, as well as input from another communication device, such as, for example, from another 10/100Base-T transceiver 140, having autonegotiation controller 142, therewithin.

FIG. 11 illustrates a second prior art configuration, this time in a microprocessorless environment. As before, MAC 200 and PHY 220 are not physically integrated but reside on separate modules. SMI controller 210 and SMI controller 222 each include a state machine that facilitate the transfer of link partner capability data 216 and 218 between LPCR 204 in MAC 200 and LPCR 224 in PHY 220. Also, similar to FIG. 10, autonegotiation controller 226 senses conditions on network channel 230, as well as input from link partner 240, which, in this example, has autonegotiation controller 242, therewithin.

Figure 12:
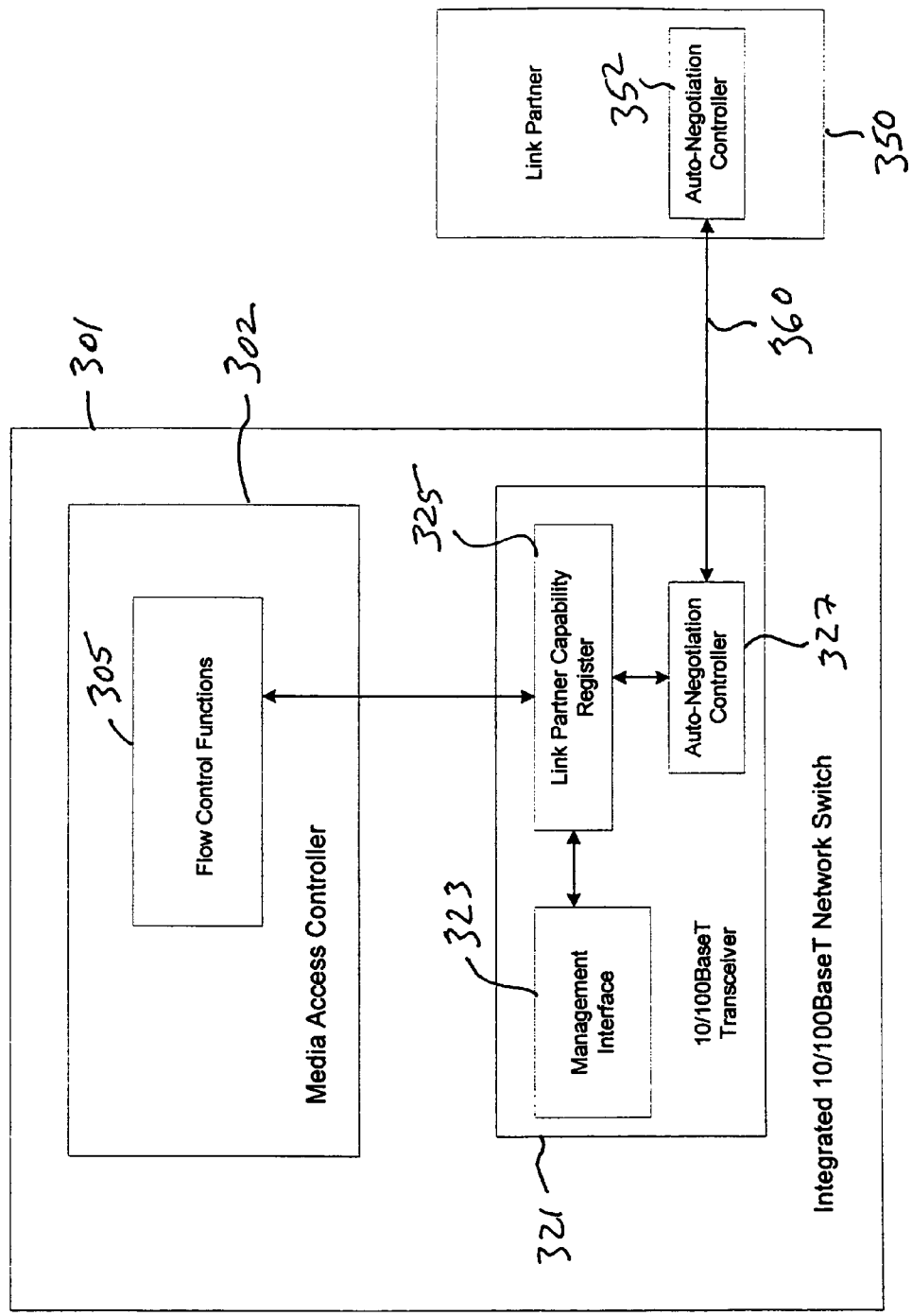
FIG. 12 is an illustration of an embodiment of the present invention employing a single link partner capability registers per MAC/PHY pair.

FIG. 12 is an implementation of the present invention that employs a single LPCR. Integrated 10/100Base-T communication device 301 is desired to be embodied as a monolithic VLSI component including MAC 302 and PHY 321, most preferably in a single die configuration. Device 301 is capable of communicating data packets with a link partner according to a selectable communication protocol. This protocol may be a 10Base-T communication protocol or a 100Base-T communication protocol, and may be half- or full-duplex. Exemplary 100Base-T protocols include, without limitation, 100Base-T4, 100Base-TX, 100Base-FX, and 100Base-T2 communications protocols. Furthermore, device 301 is capable of functioning properly whether or not link partner 350 implements a flow control protocol, such as that defined by IEEE Standard 802.3x.

Flow control functions 305 of MAC 302 can directly access the data in LPCR 325, thus permitting MAC 302 to operate integrally with PHY 321. The integration of MAC 302 and PHY 321 in device 301 can eliminate the need for an external microprocessor, as seen in FIG. 10, or a dedicated transceiver access state machine, as seen in FIG. 11. However, where external control is desired, management interface 323 is provided, permitting control by, for example, an external microprocessor or external SMI controller.

It is desirable that communication device 301 include autonegotiation controller 327 to exchange LPCR data with autonegotiation controller 352 in link partner transceiver 350. As before, it is not necessary that link partner 350 be a 100Base-T multiprotocol device with autonegotiation capabilities for the autonegotiation function in device 301 to operate properly. Such link partner 350 can lack autonegotiation capability, or even flow control capability, and could be a device employing 10Base-T technology, yet device 301 would be able to properly select the communication protocol and duplexing that is appropriate for the link partner pair and the state of the network channel 360.

Although communication device 301 has been described in terms of a single MAC 302 integrated with a single PHY 321, a skilled artisan would recognize that this limitation is an expository artifact. Indeed, device 301 can be a multi-port network switch having multiple MAC 302, each being integrally coupled with a corresponding PHY 321, with each MAC/PHY pair being constituents of each port on the multi-port device 301. A multi-port device exemplary of this embodiment of the present invention may be seen as the exemplary device 1 in FIG. 1, above. As with the example of uniport device 301, a multi-port device also is desired to be implemented as a monolithic VLSI device.

Figure 13:
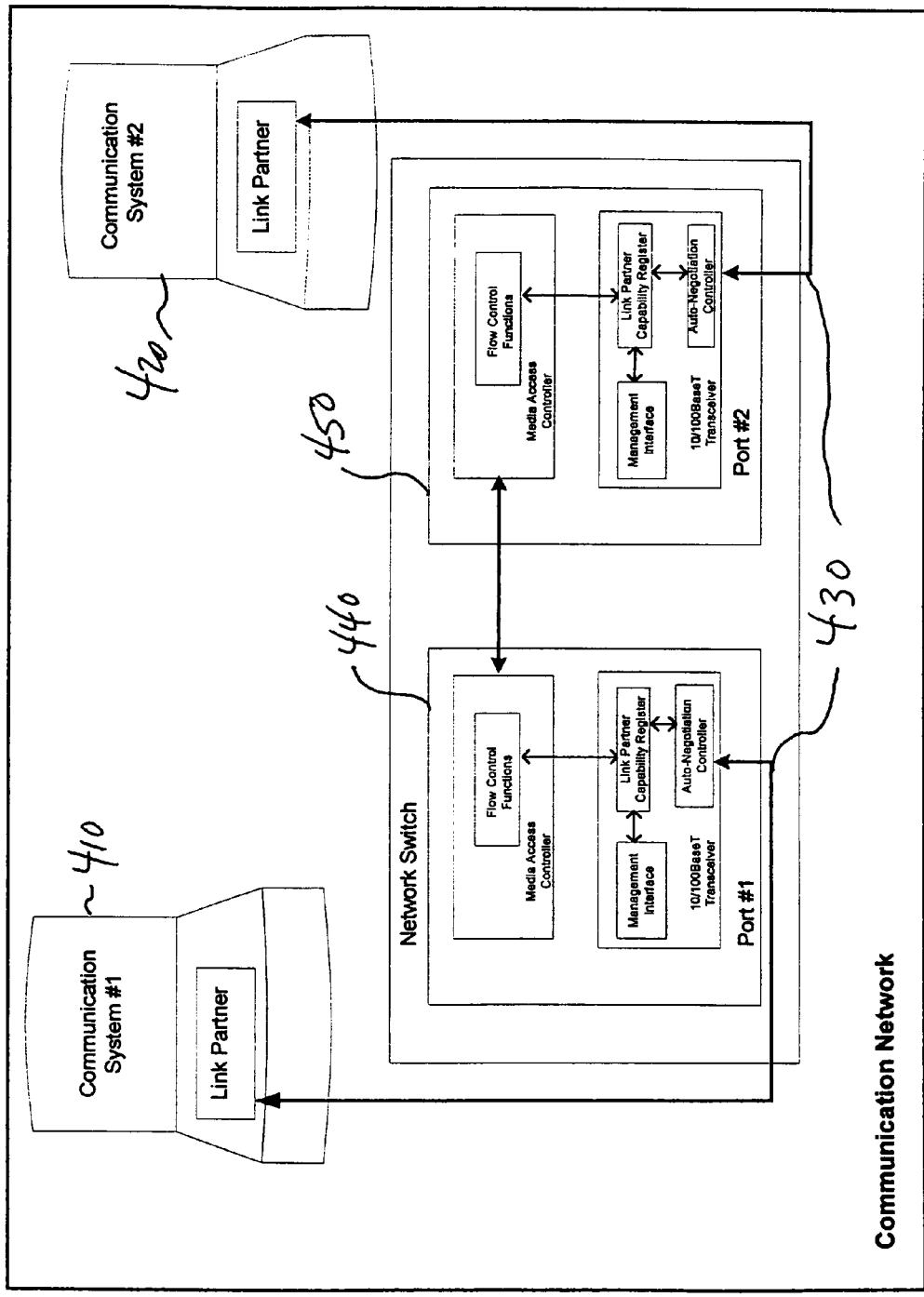
FIG. 13 is an illustration of another embodiment of the present invention in the form of a communication network.

Furthermore, a skilled artisan will realize that an additional embodiment of the present invention includes a communication network 400 by which communication systems 410, 420 exchange data packets over communication channel 430, as is illustrated in FIG. 13. Network 400 could include two integrated MAC/PHY devices 440, 450. Each of devices 440, 450 would have a single LPCR, such as device 301 in FIG. 12.

A digital adaptive equalizer may be used to remove intersymbol interference created by the transmission channel media. The equalizer accepts sampled unequalized data from an analog-to-digital converter on each channel and produces equalized data. The exemplary device can achieve an optimum signal-to-noise ratio by using a combination of feed-forward equalization, and decision feedback equalization. This technique can achieve a 100Base-TX bit error rate of less than about $1\times10^{-12}$ for transmission up to 100 meters CAT 5 twisted-pair cable, even in harsh noise environments. It is preferred that the DAE design be substantially all-digital in nature so that performance is very tolerant on-chip noise. The DAE filter coefficients are self-adapting to any quality of cable or cable length. Due to transmit pre-equalization in the 10Base-T mode, a lack of ISI in 100Base-FX mode, the DAE may be bypassed in these two modes of operation. It is also desired that the physical layer transceivers include an analog-to-digital converter (ADC), on the receive channel. In the present exemplary device, the ADC is desired to be a 6-bit 125 MHz analog-to-digital converter. The ADC samples the incoming data on the receive channel and produces a 6-bit output. The output of the ADC then is fed to the digital adaptive equalizer. It is desired that the analog circuit portion of the ADC achieve a low offset, high power supply noise rejection, fast settling time, and low bit error rate.

It further is desired that the PHY possess an all-digital clock recovery and generator block to create all internal transmit and receive clocks. Also, it is desired that the transmit clock be locked to the 25 MHz clock input while the receive clock be locked to the incoming data stream. Clock recovery circuits optimized to MLT3, NRZI, and Manchester encoding schemes can be included for use with each of the three different operating modes which may be used in this device. The input data stream can be sampled by the recovered clock and then fed synchronously to the digital adaptive equalizer.

Because a 100Base-TX data stream is not always DC-balanced, it is desirable to include a baseline wander corrector in the PHY. During operation, the receive signal passes through a transformer, thus allowing the DC offset of the differential receive input to wander. Baseline wander can greatly reduce the noise immunity of the receiver, therefore it is desirable for the transceiver to automatically compensate for baseline wander by removing the DC offset from the input signal. The multimode transmit digital-to-analog converter (DAC) transmits MLT3-coded symbols in the 100Base-TX mode, and Manchester-coded symbols in the 10Base-T mode. The DAC can perform programmable edge-rate control in TX mode which can decrease unwanted high-frequency signal components thus reducing EMI. High-frequency pre-emphasis can be performed in 10Base-T mode.

In 100Base-TX mode, the transmit data stream can be scrambled in order to reduce radiant emissions on the twisted-pair cable. This data can be scrambled by exclusive OR'ing the NRZ signal with the output of an 11-bit-wide linear feedback shift register (LFSR) which produces a 2047-bit non-repeating sequence. The scrambler reduces peaking missions by randomly spreading the signal energy over the transmit frequency range, thus eliminating peaks at certain frequencies. The receiver descrambles the incoming data stream by exclusive OR'ing it with the same sequence generated at the transmitter. The descrambler detects the state of the transmit LFSR by looking for a sequence representative of consecutive idle codes. The descrambler will "lock" to the scrambler state after detecting a sufficient number of consecutive idle code groups. The receiver will not attempt to decode the data stream unless the descrambler is locked. Once locked, the descrambler will monitor the data stream continuously to make sure that it has not lost synchronization. The receive data stream is expected to contain inter-packet idle periods. If the descrambler does not detect enough idle codes within a predetermined period, such as, for example, 724 μsec., it will become "unlocked", and the receive decoder will be disabled. The descrambler will enter the "unlocked state" when a link failure condition is detected. It may not be desirable for stream cipher scrambling/descrambling to be used in the 10Base-T modes.

MII Management

An embodiment of the exemplary device transceiver is desired to contain a complete set of MII management registers. The 5-bit transceiver address can be assigned by concatenation of the 2-bit CHIPID assigned during the reset, and the internal 3-bit port ID. All MII Management registers are accessed through the shared MII Management Port using the MDC and MDIO signals.

Media Access Controllers

The exemplary device may contain nine internal dual-speed MACs. The MACs automatically select 10 or 100 Mbps bit mode CSMA/CD, half- or full-duplex, based on the result of autonegotiation. In FDX mode, 802.3x PAUSE frame-based flow control also can be determined through autonegotiation. The aforementioned MACs are compliant with IEEE 802.3, 802.3u, and 802.3x specifications.

Receive Function

The MAC initiates frame reception following the assertion of receive data valid indication from the physical layer. The MAC monitors the frame for the following error conditions: (1) receive error indication from the PHY; (2) runt frame error, if the frame is less than 64 bytes; (3) CRC error; and (4) long frame error, if the frame size is greater than a predetermined value, for example, 1522 bytes or 1536 bytes if no errors are detected, it is desirable that the frame be processed by the switch controller. However, frames with errors typically are discarded.

Transmit Function

Frame transmission typically begins with the switch controller queuing a frame to the MAC transmitter. The frame data is transmitted as received from the switch controller. The transmit controller is responsible for preamble insertion, carrier deferral, collision back-off, and interpacket gap (IPG) enforcement. In the half-duplex mode, when a frame is queued for transmission, the transmit controller behaves as specified by the 802.3 requirements for frame deferral. Following frame deferral, the transmitter can add 8 bytes of preamble and SFD to the frame data received from the switch controller. If, during frame transmission, a collision is observed, and the collision window timer has not expired, the transmit controller asserts a jam, and then executes a selected back-off algorithm. The frame will be re-transmitted when appropriate. After a pre-selected number of collisions, for example, the sixteenth consecutive collision, the back-off algorithm starts over at the initial state, the collision counter is reset, and attempts to transmit the current frame continue. Following a late collision, the frame is aborted and the switch controller is allowed to queue the next frame for transmission. While in full-duplex mode, the transmission controller ignores carrier activity and collision indication. Transmission begins after the switch controller queues the frame and at 96-bit-times of IPG have been observed.

Flow Control

It is desired that the exemplary device implement an intelligent flow control algorithm to minimize the system impact resulting from flow control measures. It is preferred that the buffer memory allocation be adaptive to the status of each port speed and duplex mode providing an optimal balance between flow management and per-port memory depth. It is further desirable that the exemplary device initiate flow control in response to buffer memory conditions on a per-port basis. The MACs are capable of flow control in both full- and half-duplex modes. In the half-duplex mode, the switch is capable of performing two types of flow control.

In a first type of flow control, the MAC back pressures a receiving port by transmitting a 96-bit-time jam packet to the port. A single jam packet is asserted for each receive packet for the duration of the time that the port is in the flow control state. In another type of flow control, back pressure can be effected by transmitting consecutive 1984 byte frames with a minimum IPG and a bad CRC until the port exits the flow control state. Flow control in the full-duplex mode functions substantially as specified by the IEEE Standard 802.3x requirements. In the receiver, MAC flow control frames are recognized and, when properly received, set the flow control PAUSE time for the transmit controller. The PAUSE time is assigned from the 2 byte PAUSE_time field following PAUSE OP CODE. MAC control PAUSE frames are not forwarded from the receiver to the switch controller. When the switch controller requests flow control from a port, the transmit controller transmits a MAC control PAUSE frame. When the condition which cause the flow control state to be entered is no longer present, a MAC control PAUSE frame is sent. The flow control capabilities of the exemplary device are enable-based on the results of autonegotiation, and the state of the flow control signals that are loaded during the device reset. Flow control in the half-duplex mode is independent of the state of the link partner's flow control capability.

Switch Controller

In the exemplary device, the switch controller manages packet forwarding between the MAC receive and transmit ports through the frame buffer memory, with a store-and-forward architecture. The switch controller encompasses the functions of buffer management, memory arbitration, and transmit descriptor queuing.

Buffer Management

The frame buffer memory can be divided into 2 k byte blocks. Each packet received is allocated one block of memory, of which, a maximum of 1536 bytes can be used for frame data storage. Frame data is stored to the memory block as the packet is received. After reception, the frame is queued to the egress port(s) transmit queue. For unicast frames, following transmission of a packet from the frame buffer memory, the block of memory for the frame can be released to the free buffer pool. If the frame is destined to multiple ports, the memory block is not released until all ports have completed transmission of the frame.

Memory Arbitration

Processes requesting access to the external memory include the receive and transmit frame data handlers, address learning and resolution functions, and output port queue managers. These processes are arbitrated to provide fair access to the memory and to minimize latency of critical processes to provide a fully non-blocking solution. A switch controller maintains an output port queue for each port. The queues can be located in the external memory and the maximum depth of the queue is desired to be the maximum number of memory blocks within the frame buffer memory. Transmit descriptors are updated after the packet has been received, and a destination port resolved. One transmit descriptor is assigned to each destination port queue, linking the destination with the frame data. In the case of multicast and broadcast packets, a transmit descriptor for the packet will be assigned to the transmit descriptor queues of multiple ports. For each port, frames are initiated for transmission with a minimum IPG until the transmit descriptor queue of the port is empty.

SRAM Controller

The SRAM controller interfaces directly to an external synchronous SRAM device and efficiently executes memory transfers between the exemplary device and memory device(s). It is desirable that the exemplary device support several options for a specific SSRAM type, size, and speed. Non-blocking performance can be achieved with standard SSRAM devices. The exemplary device can be configured to interface to either 512 k byte or 1M byte of external SSRAM. The larger memory capacity can provide additional frame buffers, thus minimizing the impact of network bursts. It is preferred that the SSRAM be configured to 64-bit data words, and that all accesses to memory are 64-bit a line. In the larger memory configuration, the switching device can support an additional 8 k unicast addresses and 256 frame buffers.

Expansion Interface

It also is desired that the exemplary device provide an expansion port. In an embodiment for the present invention which is implemented using eight ports, the expansion interface can serve as a ninth port. This port can be configured to operate as an MII interface to an external transceiver, or as a high-speed expansion interface. In either mode, packets can be forwarded to the expansion port following address resolution and frame buffering to memory. The ninth port can maintain a transmit descriptor queue in the same manner as the other ports. The expansion interface can operate in two modes: (1) the MII mode; and (2) the expansion port mode. In the MII mode, the expansion interface can be configured to function as an MII port capable of interfacing directly to an external TX or FX transceiver. In this mode, the port functions substantially identically to the eight integrated ports.

In addition to standard MII signals, the exemplary device can use an individual active-low link speed and duplex mode signals from the transceiver. The device also can generate port LEDs for the port in the MII mode equivalent to the LEDs of the internal transceivers. Enabling the expansion port mode permits the expansion interface to operate as a high-speed expansion port. This port can use a full-duplex interface with a 16-bit in and out data buses running at up to 66 MHz thus providing over 2 Gbps of bandwidth. The signals provided support a direct connection to a second switching device. This enables the development of a glueless 16-port switch system with non-blocking performance. For further expansion, the port may be configured in a daisy chain with additional network switching devices. It is desired to forward frames to the expansion port in the order queued. All bytes of each frame are transmitted before initiating the transfer of a second frame. Frames may be fragmented into 32-byte bursts across the expansion interface. Frames received via the expansion interface may be processed as follows:

(1) The first 16-bit word of the transfer contains the source CHIPID and the frame length. The source CHIPID is saved for address learning.

(2) Address resolution determines the destination port of the frame by using the destination address within the frame. Concurrently, the frame is buffered to memory.

(3) After the frame has been buffered to memory, the transmit descriptor queue(s) of the destination port(s) are updated. The source address is learned by the receiving device and saved to the local address table. The transmit port ID field of the address table entry is assigned to be the source CHIPID saved from the 16-bit header. Subsequent packets received at a local port with a matching destination address will be forwarded to the expansion port.

The foregoing merely illustrates the principles of the invention, and it will thus be appreciated that those skilled in the art will be able to devise various alternative arrangements which, although not explicitly described herein, embody the principles of the invention within the spirit and scope of the following claims.

What is claimed is:

1. A communication device, comprising:
   a transceiver (PHY) communicating data packets with a link partner according to a selectable communication protocol, the PHY having a data register therewithin, the data register receiving data representative of the selectable communication protocol; and
   a media access controller (MAC) adapted for use in a packet-based communication network and operably coupled with the transceiver, the media access controller directly accessing the data register for receiving data representative of the selectable communication protocol.

2. The communication device of claim 1, wherein the PHY is integrally coupled with the MAC.

3. The communication device of claim 2, wherein the PHY and the MAC are integrated on a monolithic VLSI component.

4. The communication device of claim 1, wherein the selectable communication protocol is a protocol defined by an IEEE Standard 802.3 communication protocol.

5. The communication device of claim 4, wherein the IEEE Standard 802.3 protocol includes a 10Base-T communication protocol and a 100Base-T communication protocol.

6. The communication device of claim 5, wherein the 100Base-T communication protocol includes a 100Base-T4 communication protocol, a 100Base-TX communication protocol, a 100Base-FX communication protocol, and a 100Base-T2 communication protocol.

7. The communication device of claim 5, wherein the IEEE Standard 802.3 protocol is one of a full-duplex communication protocol and a half-duplex communication protocol.

8. The communication device of claim 5, wherein the PHY and the MAC are integrally coupled on a monolithic VLSI component.

9. The communication device of claim 5, wherein the IEEE Standard 802.3 communication protocol includes an autonegotiation communication protocol, and wherein the device further comprises an autonegotiation controller, operably coupled to the data register, the autonegotiation controller selecting the selectable communication protocol.

10. The communication device of claim 9, wherein the data representative of the selectable communication protocol include autonegotiation state data.

11. The communication device of claim 10, wherein the data register is a link partner capability register.

12. The communication device of claim 8, further comprising a plurality of PHY and a plurality of MAC, each PHY having a MAC uniquely corresponding therewith.

13. The communication device of claim 12, wherein the IEEE Standard 802.3 communication protocol includes an autonegotiation communication protocol, and wherein the device further comprises an autonegotiation controller corresponding with each of the plurality of PHY, the autonegotiation controller being operably coupled to the data register, the autonegotiation controller selecting the selectable communication protocol.

14. The communication device of claim 13, wherein the data register is a link partner capability register.

15. A communication network, comprising:
  a transceiver (PHY) communicating data packets through a communication network according to a selectable communication protocol, the PHY having
    a PHY controller controlling the selectable communication protocol of the communication network, and
    a state data register storing data representative of a state of the selectable communication protocol;
  a media access controller (MAC), operably coupled with a first communication system, the MAC being integrably coupled with the PHY, the MAC directly accessing the state data register corresponding with the state data register in the PHY;
  a link partner operably coupled with a second communication system, the link partner cooperating with the PHY controller to select the selectable communication protocol; and
  a communication channel, operably coupling the PHY with the link partner.

16. The communication network of claim 15, wherein the PHY and the MAC are integrated on a monolithic VLSI component.

17. The communication network of claim 16, wherein the selectable communication protocol is a protocol defined by an IEEE Standard 802.3 communication protocol.

18. The communication network of claim 17, wherein the IEEE Standard 802.3 protocol includes a 10Base-T communication protocol and a 100Base-T communication protocol.

19. The communication network of claim 18, wherein the 100Base-T communication protocol includes a 100Base-T4 communication protocol, a 100Base-TX communication protocol, a 100Base-FX communication protocol, and a 100Base-T2 communication protocol.

20. The communication network of claim 18, wherein the IEEE Standard 802.3 protocol is one of a full-duplex communication protocol and a half-duplex communication protocol.

21. The communication network of claim 18, wherein the IEEE Standard 802.3 communication protocol includes an autonegotiation communication protocol, and wherein the PHY controller further comprises an autonegotiation controller, operably coupled to the data register, the autonegotiation controller selecting the selectable communication protocol.

22. The communication network of claim 17, wherein the data representative of the selectable communication protocol include autonegotiation state data.

23. The communication network of claim 22, wherein the data register is a link partner capability register.

* * * * *